United States Patent Office 3,075,918
Patented Jan. 29, 1963

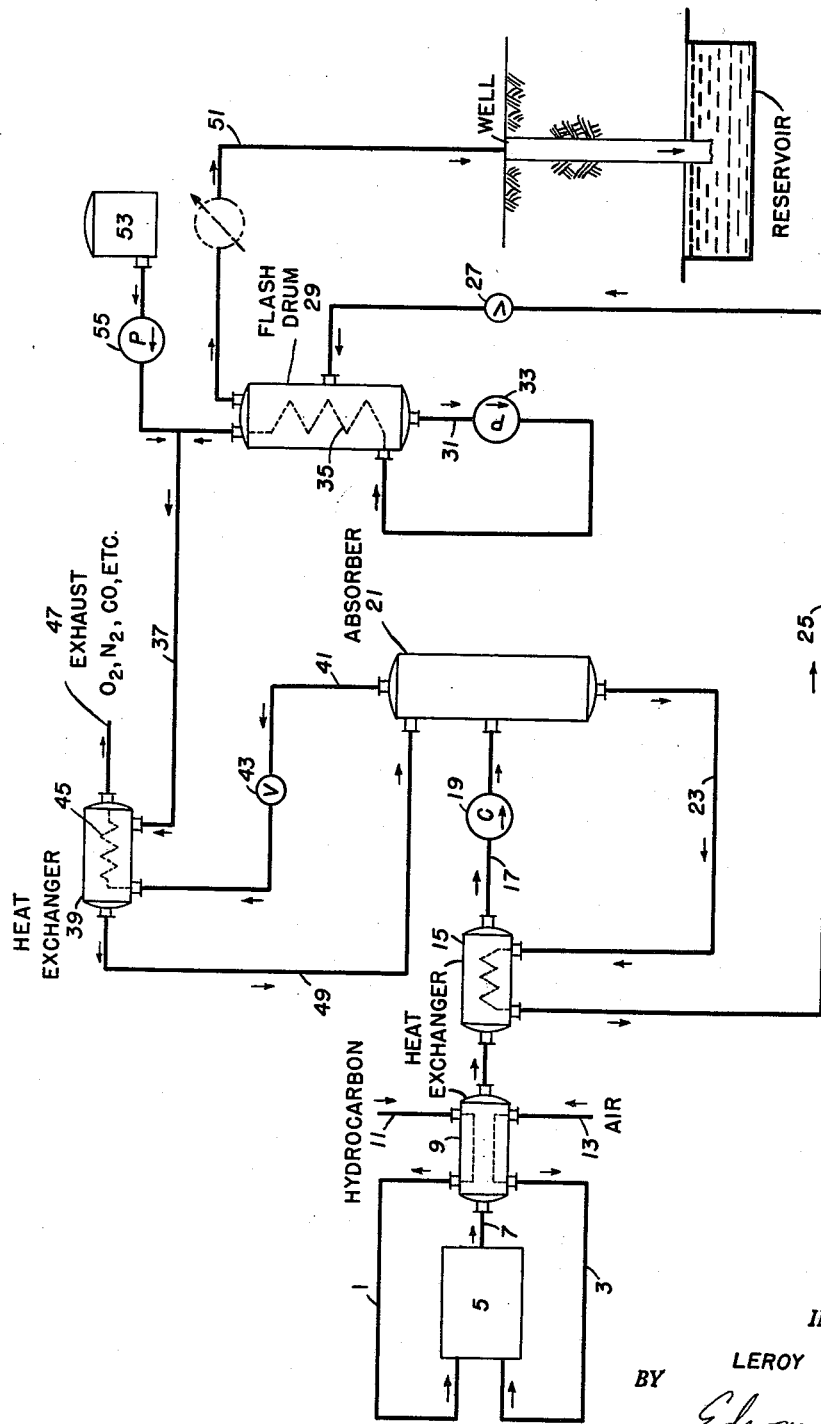

3,075,918
SECONDARY RECOVERY OF PETROLEUM
Le Roy W. Holm, Crystal Lake, Ill., assignor to The Pure Oil Company, Chicago, Ill., a corporation of Ohio
Filed Dec. 8, 1958, Ser. No. 778,971
12 Claims. (Cl. 252—8.55)

This invention relates to the recovery of oil from petroleum-bearing geological reservoirs and to an improvement over the conventional type of gas-injection recovery method. More specifically, this process is concerned with an improved method of producing a fluid for injection into petroleum-bearing reservoirs.

Application Serial No. 718,985, now abandoned, discloses an improved method of recovering petroleum from underground geological reservoirs, in which method a solution of carbon dioxide or equivalent normally-gaseous fluid in hydrocarbon oil or equivalent oily substance is injected into the reservoir under pressure sufficient to retain a substantial amount of the gaseous fluid in solution. Then there is injected in the formation under high pressure carbon dioxide or equivalent gaseous fluid which will go into solution in the reservoir fluid, and the oil and carbon dioxide or equivalent gaseous material is driven toward the producing wells by the injection of inert driving fluid. It has now been found that by dissolving at least a portion of the carbon dioxide in oil and injecting the solution ahead of the compressed carbon dioxide, a substantial increase in the amount of oil recoverable by gas flooding is obtained. It has further been found that improved results can be obtained by continuing the injection of a carbon dioxide driving fluid which contains some hydrocarbons.

Briefly, this invention is directed to a process for preparing an injection fluid comprising a mixture of carbon dioxide and a liquid hydrocarbon. Carbon dioxide produced by the combustion of a hydrocarbon is separated from the other combustion products by preferential absorption in a hydrocarbon oil. The carbon dioxide when flashed from the absorbing oil includes a portion of the oil and thus the desired mixture is obtained.

The utility of a gas-injection process is dependent upon the availability of an economical source of a suitable gas, such as carbon dioxide, at the location where injection is to take place. The utility of such a process is further dependent upon an economical method of mixing carbon dioxide and hydrocarbon oil to produce an injection fluid of the proper proportions. The proportions of oil and carbon dioxide used to produce an injection fluid which will obtain optimum petroleum recovery varies, depending upon the particular geological formation in which the petroleum occurs. The actual proportions of the hydrocarbon oil and carbon dioxide used also will depend, of course, upon economic considerations, that is, the cost of the injection process and fluids injected and the value of the petroleum expected to be recovered.

Accordingly, it is an object of this invention to provide a method by which a suitable injection fluid comprising a mixture of hydrocarbon oil and carbon dioxide can be economically produced at the location where injection is to take place. Another object of this invention is to provide a method for the economical production of substantially pure carbon dioxide for injection into petroleum-bearing underground reservoirs. A further object of this invention is to supply a process by which a fluid comprising a hydrocarbon oil and carbon dioxide can be produced, and the proportions of hydrocarbon oil and carbon dioxide varied by adjusting the conditions of temperature and pressure under which the fluid is produced. A further object of this invention is to provide a process by which a fluid composed of hydrocarbon oil and carbon dioxide can be produced in the proportions known to give the greatest overall economy of petroleum recovery during various stages from the beginning to the end of a secondary recovery operation. Still another object of this invention is to increase petroleum recovery from underground reservoirs by the use of an improved flooding fluid consisting of carbon dioxide and a small amount of hydrocarbon oil. This improvement in recovery appears to be caused, at least in part, by the increased viscosity of the injection fluid and the resulting more favorable mobility ratio between the displaced and displacing fluids.

The process of this invention is illustrated in the flow diagram of FIG. 1. Natural gas or a heavier hydrocarbon, whichever is more economically and abundantly available in the oil field being produced, is charged through line 1 and is burned with an excess of air charged through line 3 in burner 5 to produce a gas containing carbon dioxide. Conventional combustion equipment can be used. The combustion products are conducted via line 7 to heat exchanger 9, where they are partially cooled by indirect contact with the gas and air charged through lines 11 and 13, respectively. The partially-cooled combustion products then pass through heat exchanger 15 where they are further cooled by indirect exchange with absorption oil to a temperature of about 100°–300° F., pass through line 17 to compressor 19 where they are compressed to a pressure in the range of 600 to 1500 p.s.i.g., and then pass on to absorber 21. In absorber 21, the combustion products are contacted with an oil which preferentially absorbs carbon dioxide. Conditions in absorber 21 are maintained which favor high solubility of carbon dioxide in the absorbent oil and relatively low solubility of the other gaseous components of the combustion products. In general, high pressures and low temperatures are maintained in the absorber.

The absorption oil containing dissolved carbon dioxide is withdrawn from absorber 21 through line 23 and passes to heat exchanger 15 where it is heated by indirect heat exchange with the partially-cooled combustion products which also pass through heat exchanger 15. Sufficient heat is transferred to the absorption oil and dissolved carbon dioxide to desorb carbon dioxide from the oil. The heated carbon dioxide and absorption oil is then transferred through line 25 to expansion valve 27 where the pressure on the absorption oil and carbon dioxide solution is substantially decreased so as to flash off carbon dioxide and a desired portion of hydrocarbon oil from the absorption oil in flash-drum 29. The lean absorption oil is withdrawn from flash-drum 29 through line 31 by means of pump 33 which restores the lean absorption oil to absorption pressure. The pressurized lean oil then flows through coil 35 in flash-drum 29 where it is cooled, by transfer of heat to the expanded carbon dioxide, to a temperature not greater than about 100° F. The partially-cooled lean oil then flows through line 37 to heat exchanger 39 where it is still further cooled by the transfer of heat to the unabsorbed portion of the combustion gases. The unabsorbed portion of the combustion gases, composed principally of nitrogen and oxygen, pass from absorber 21 through line 41 to expansion valve 43 where they are cooled by expansion to substantially atmospheric pressure. These cooled gases then pass through coil 45 and absorb heat from the lean oil in heat exchanger 39, which contains coil 45. The gases then pass on to be expelled to the atmosphere via line 47. The cooled lean absorption oil flows from heat exchanger 45 through line 49 to absorber 21 where it begins a new cycle of preferential carbon dioxide absorption.

Purified carbon dioxide containing any desired small amount of hydrocarbon oil, that is, absorption oil, is withdrawn from flash-drum 29 through line 51 for use in injection into a petroleum-containing reservoir. The major portion of the oil included with the flashed carbon dioxide is in the liquid state. A minor portion of the included hydrocarbon oil may exist as vapor. The proportion of the oil existing as liquid and as vapor will depend upon the molecular weight of the oil, the quantity of oil included, and the temperature and pressure of the oil-carbon dioxide mixture. Optimum oil recoveries are achieved when the oil exists as a liquid when injected. Make-up absorption oil is added to the system as needed to replace the absorption oil flashed off with the carbon dioxide produced. Make-up oil is supplied from oil-supply 53 and is pumped by pump 55 into line 37.

Pressures and temperatures maintained in absorber 21 and flash-drum 29 are dependent upon the type of absorption oil used and the amount of oil to be retained in the purified carbon dioxide. The composition of the fluid to be injected into the petroleum-producing reservoir, that is, the proportion of oil and carbon dioxide in this fluid, is controlled by adjusting the temperatures and pressures of absorber 21 and flash-drum 29. In general, suitable absorber temperatures and pressures are encompassed within the ranges from 20° to 70° F. and 600 to 1500 p.s.i.g., and suitable flash-drum temperatures and pressures are between 100° to 300° F. and 50 to 500 p.s.i.g. The preferred conditions of operation are limited, however, to the range of 30° to 40° F. and 800 to 1000 p.s.i.g. for the absorber, and 200° to 300° F. and 50 to 300 p.s.i.g. for the flash-drum. It may sometimes be advantageous to provide auxiliary heating and cooling means to achieve the desired temperatures and pressures of operation. The process is illustrated by the following non-limiting example:

Carbon dioxide is recovered from flue gas, containing about 15% by volume carbon dioxide, by absorption in light gas-oil having an average molecular weight of 140. The absorption is conducted at a temperature of 40° F. and a pressure of 1000 p.s.i.g. to achieve an absorption of about 70 pounds of carbon dioxide per barrel of gas-oil. The resulting solution of carbon dioxide in gas-oil is flashed at 100 p.s.i.g. and 300° F. to obtain a gaseous mixture consisting of 33% w. oil and 67% by weight carbon dioxide.

In most instances it is advantageous to operate the flash-drum at a pressure substantially greater than that of the petroleum-containing reservoir to permit injection of the fluid containing carbon dioxide without the necessity of resorting to additional compression means. In some cases it may be desirable to add means for cooling the gases after leaving flash-drum 29, but before being injected into the petroleum-containing reservoir, because of the elevated flash-drum temperature which may be required to vaporize the desired amount of oil so that it will mix and flow with the flashed carbon dioxide.

While lease oil is usually the least costly and most practical absorption oil for use with this process, the use of lease oil is somewhat limited in that the amount of this oil which can be flashed with the carbon dioxide is small because lease oil has a relatively high content of heavier hydrocarbon components. Therefore, where large amounts of hydrocarbon oil are to be present in the fluid to be injected, absorption oils of lower-molecular-weight hydrocarbons, such as gas-oil or kerosene, are recommended. When lower-molecular-weight hydrocarbons are used, as much as 50% by volume of hydrocarbon oil can be flashed with the carbon dioxide so as to give an injection fluid consisting of approximately half carbon dioxide and half hydrocarbon oil by volume.

It is therefore apparent that the process of this invention will readily supply a superior carbon dioxide-oil solution for injection into petroleum-containing reservoirs, and that the proportion of carbon dioxide and oil can be adjusted to produce an injection fluid of the proportions desired for use in all stages of the injection process. During the initial injection period it is often desirable to inject a fluid comprising a solution of carbon dioxide in oil. During this initial injection period, if a solution of carbon dioxide in oil is desired it can be withdrawn directly from flash-tank 29 by way of line 31 and pump 33, and can be diverted for injection into the oil well rather than recycled for re-use in the process of this invention. The excess carbon dioxide produced during this period may be stored for later use. When an injecting fluid containing a greater proportion of carbon dioxide and less hydrocarbon oil is desired, injection of oil drawn from the flash-drum can be discontinued, and flash-drum conditions modified to cause the flashing of a fluid consisting of carbon dioxide and the desired, lesser amount of hydrocarbon oil. Still later in the flooding process it may be desired to inject substantially pure carbon dioxide in order to avoid unnecessary loss of the more expensive hydrocarbon oil. Flash-drum conditions can then be again modified to produce the flashing of substantially all of the carbon dioxide in pure form from the absorption oil. When this is done, substantially all of the absorption oil will be recycled to absorber 6 for re-use.

It appears that by proper adjustment of the pressure-temperature conditions of flash-drum 29, and by the drawing off of more or less lean hydrocarbon oil from flash-drum 29 through line 31 and pump 33 and injecting this hydrocarbon oil with all or part of the carbon dioxide flashed off in flash drum 29, the composition of the injected fluid can be varied from substantially pure carbon dioxide to a mixture of about half and half carbon dioxide and hydrocarbon oil. As explained, it will in some cases be desirable to adjust the molecular weight of the hydrocarbon oil used to obtain the desired injection fluid composition.

Accordingly, I claim as my invention:

1. A process for preparing a solution consisting essentially of carbon dioxide and hydrocarbon oil comprising the steps of burning a hydrocarbon in air, cooling and compressing the combustion products and selectively absorbing removing the carbon dioxide from said products by absorption in a hydrocarbon an oil preferentially absorbent for carbon dioxide, flashing off carbon dioxide from said oil under conditions of temperature and pressure to include a substantial amount of said oil in the carbon dioxide, and recycling the remaining oil to again absorb carbon dioxide from combustion products.

2. A process in accordance with claim 1 in which the amount of oil included with the carbon dioxide is controlled by regulation of the pressure and temperature at which the carbon dioxide is flashed from said oil.

3. A process for preparing a solution consisting essentially of carbon dioxide and hydrocarbon oil comprising the steps of burning a hydrocarbon in air, cooling and compressing the combustion products and removing the carbon dioxide content of said combustion products by absorption in an oil preferentially absorbent for carbon dioxide, heating the oil and absorbed carbon dioxide by heat exchange with hot combustion products, flashing off the carbon dioxide from the oil and including a substantial portion of said oil with the carbon dioxide by reducing the pressure of the absorbed carbon dioxide and oil, collecting and compressing the remaining oil, cooling the compressed oil first by heat exchange with the flashed carbon dioxide and included oil and then by heat exchange with the combustion products from which carbon dioxide has been removed, the combustion products from which carbon dioxide has been removed having been cooled by expansion, and recycling the compressed, cooled, oil to again absorb carbon dioxide from fresh combustion products.

4. A process according to claim 3 in which the amount of oil included with the carbon dioxide is controlled by regulation of the pressure and temperature at which carbon dioxide is flashed from said oil.

5. A process for preparing a solution consisting essentially of carbon dioxide and hydrocarbon oil comprising the steps of burning a hydrocarbon in excess air, cooling and compressing the combustion products and removing the carbon dioxide content of said combustion products by absorption in an oil preferentially absorbent for carbon dioxide, said absorption occurring at a temperature in the range of 20° to 70° F. and a pressure in the range of 600 to 1500 p.s.i.g., heating the oil and absorbed carbon dioxide by heat exchange with hot combustion products, flashing off the carbon dioxide from the oil and including a substantial portion of said oil with the flashed carbon dioxide by reducing the pressure of said absorbed carbon dioxide and oil, the temperature and pressure of said carbon dioxide and included oil after flashing being within the range of 100° to 300° F. and 50 to 500 p.s.i.g., collecting and compressing the remaining oil, cooling the compressed oil first by heat exchange with the flashed carbon dioxide and included oil and then by heat exchange with the combustion products from which carbon dioxide has been removed, the combustion products from which carbon dioxide has been removed first being cooled by expansion to atmospheric pressure, and recycling the compressed, cooled oil to absorb carbon dioxide from fresh combustion products.

6. A process according to claim 5 in which the amount of oil included with the carbon dioxide is controlled by regulation of the pressure and temperature at which said carbon dioxide is flashed from said oil.

7. A process for the production of a solution for injection into a subterranean reservoir, said solution consisting essentially of carbon dioxide and oil, comprising burning a hydrocarbon in air, cooling and compressing the combustion products and selectively absorbing carbon dioxide from said products in a hydrocarbon oil preferentially absorbent for carbon dioxide, flashing off carbon dioxide from said hydrocarbon oil under conditions to include a substantial amount of said hydrocarbon oil in the carbon dioxide, and recycling the remaining hydrocarbon oil to again absorb carbon dioxide from fresh combustion products, said carbon dioxide and included hydrocarbon oil being flashed at a pressure in excess of the pressure in the said reservoir.

8. A process according to claim 7 in which the carbon dioxide and included oil is mixed with an oil preferentially absorbent for carbon dioxide before being injected into said reservoir.

9. A method in accordance with claim 7 in which the ratio of the volumes of said hydrocarbon oil and carbon dioxide in the produced solution are varied from an initial higher ratio to a final lower ratio during said injection by altering the conditions of temperature and pressure at which the carbon dioxide is flashed.

10. A method in accordance with claim 9 in which said absorption takes place at a temperature in the range of 20° to 70° F. and a pressure in the range of 600 to 1500 p.s.i.g.

11. A method in accordance with claim 10 in which the temperature and pressure of said carbon dioxide and included oil after flashing are within the range of 100° to 300° F. and 50 to 500 p.s.i.g.

12. A method in accordance with claim 11 in which the composition of said solution is varied from an initial composition of about 50% by volume hydrocarbon oil and 50% by volume carbon dioxide to a final composition consisting of substantially pure carbon dioxide by altering the conditions of temperature and pressure at which the carbon dioxide is flashed.

References Cited in the file of this patent
UNITED STATES PATENTS

| | | |
|---|---|---|
| 2,048,656 | Hunt et al. | July 21, 1936 |
| 2,398,123 | Sowers | Apr. 9, 1946 |
| 2,734,578 | Walter | Feb. 14, 1956 |
| 2,875,830 | Martin | Mar. 3, 1959 |
| 2,875,832 | Martin | Mar. 3, 1959 |
| 2,875,833 | Martin | Mar. 3, 1959 |
| 2,926,752 | Redemann | Mar. 1, 1960 |